(12) United States Patent
Murolo et al.

(10) Patent No.: US 9,676,311 B2
(45) Date of Patent: Jun. 13, 2017

(54) VEHICLE SEAT ASSEMBLY WITH COMPOSITE FRAME

(71) Applicant: Faurecia Automotive Seating, LLC, Troy, MI (US)

(72) Inventors: Leo Murolo, Bouville (FR); Yang Cao, Troy, MI (US); Brice Lassalle, Les Loges en Josas (FR); Ravikant Deore, Nashik (IN); John Perraut, Rochester Hills, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 36 days.

(21) Appl. No.: 13/904,607

(22) Filed: May 29, 2013

(65) Prior Publication Data

US 2013/0320742 A1 Dec. 5, 2013

Related U.S. Application Data

(60) Provisional application No. 61/652,563, filed on May 29, 2012.

(51) Int. Cl.
*B60N 2/68* (2006.01)
*B60N 2/225* (2006.01)
*B60N 2/02* (2006.01)

(52) U.S. Cl.
CPC ............. *B60N 2/68* (2013.01); *B60N 2/2252* (2013.01); *B60N 2/682* (2013.01); *B60N 2002/024* (2013.01)

(58) Field of Classification Search
USPC .................................................. 297/452.18
See application file for complete search history.

(56) References Cited

U.S. PATENT DOCUMENTS

| | | | | |
|---|---|---|---|---|
| 5,954,403 A * | 9/1999 | Mock et al. | ............. | 297/452.18 |
| 7,677,669 B2 * | 3/2010 | Blankart | ................. | 297/452.18 |
| 8,783,780 B2 * | 7/2014 | Hoshi | ....................... | 297/452.18 |
| 8,894,154 B2 | 11/2014 | Kulkarni et al. | | |
| 2003/0117003 A1 * | 6/2003 | Fourrey et al. | .......... | 297/452.18 |
| 2005/0023880 A1 * | 2/2005 | Fourrey et al. | .......... | 297/452.18 |

(Continued)

FOREIGN PATENT DOCUMENTS

DE 4208150 A1 * 9/1993 ............... B60N 2/44
WO WO2010101874 A1 9/2010

*Primary Examiner* — David E Allred
(74) *Attorney, Agent, or Firm* — Reising Ethington P.C.

(57) ABSTRACT

A vehicle seat assembly includes a composite frame with continuous-fiber reinforced (CFR) material along laterally spaced side members and cross members. The CFR material may be in a continuous piece along all four frame members to provide structural rigidity that is superior to that of separate pieces of CFR material. The pieces of CFR material may define a foundation portion of the seat frame and may be at least partly embedded in a thermoplastic accessory mounting portion, which is also part of the frame. An overmolding process can be used to at least partially encapsulate the CFR material in the accessory mounting portion with thermoplastic material along opposite sides of the CFR material. The overmolding process can also be used to embed recliner support plates in the composite frame. The frame may have an S-shaped cross section, facilitating simplified mold design and providing beam-like rigidity along multiple directions.

18 Claims, 6 Drawing Sheets

(56) References Cited

U.S. PATENT DOCUMENTS

| | | |
|---|---|---|
| 2008/0038569 A1 | 2/2008 | Evans et al. |
| 2008/0258337 A1* | 10/2008 | Ajbani et al. ................. 264/241 |
| 2011/0316320 A1* | 12/2011 | Kulkarni ................ B60N 2/686 |
| | | 297/452.48 |
| 2012/0267935 A1* | 10/2012 | Zekavica et al. ......... 297/452.18 |
| 2013/0257131 A1* | 10/2013 | Nishiura et al. ......... 297/452.18 |
| 2014/0139004 A1* | 5/2014 | Matsumoto et al. .... 297/452.18 |
| 2014/0159462 A1* | 6/2014 | Matsumoto et al. .... 297/452.18 |
| 2014/0377498 A1* | 12/2014 | Flock ................ B29C 45/14631 |
| | | 428/98 |

* cited by examiner

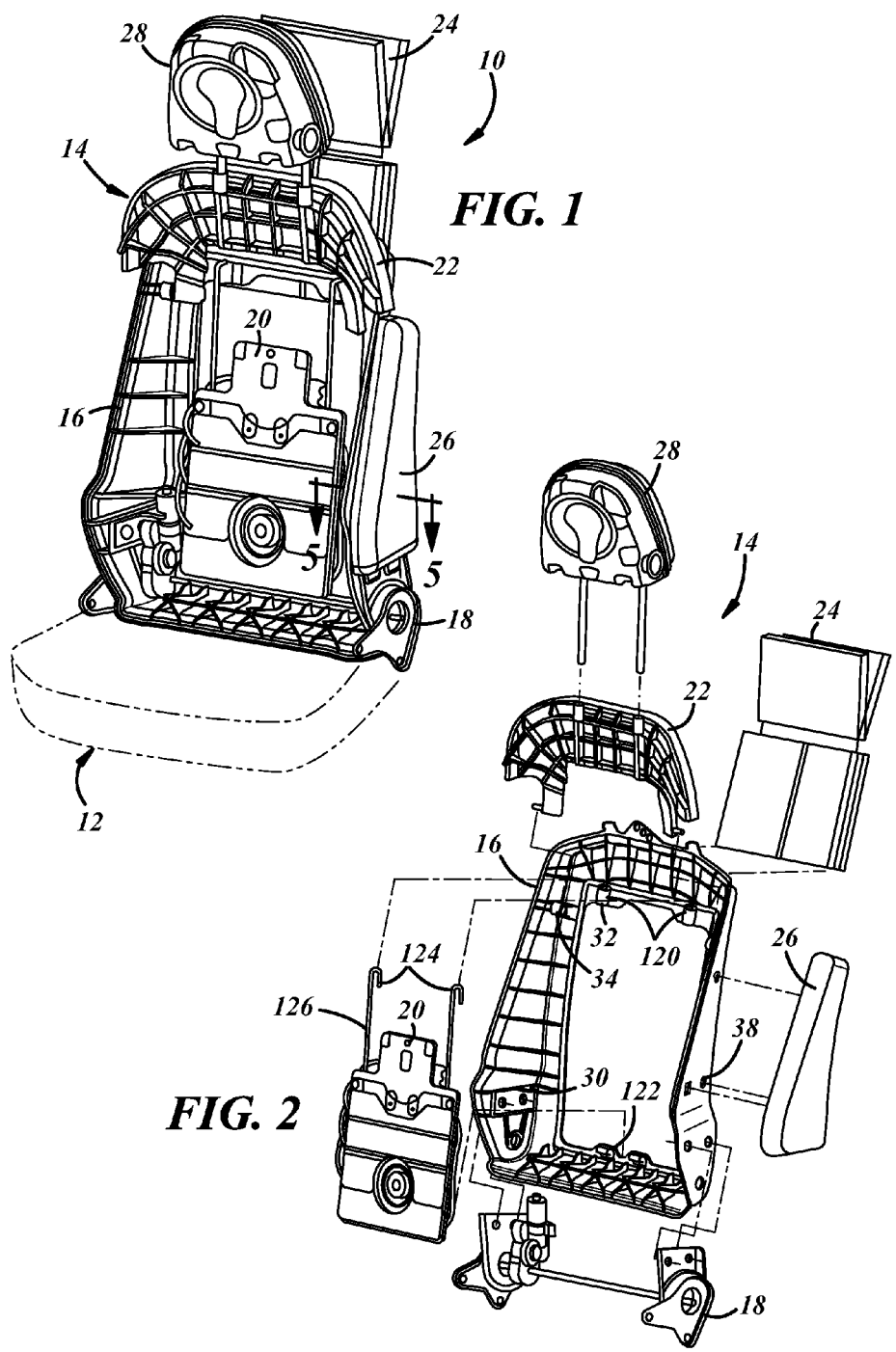

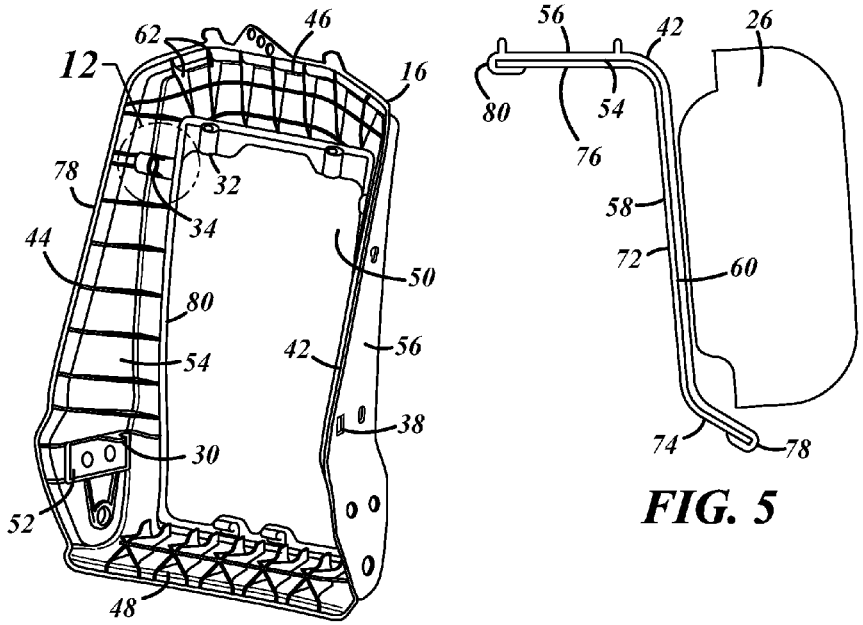
FIG. 3
FIG. 5
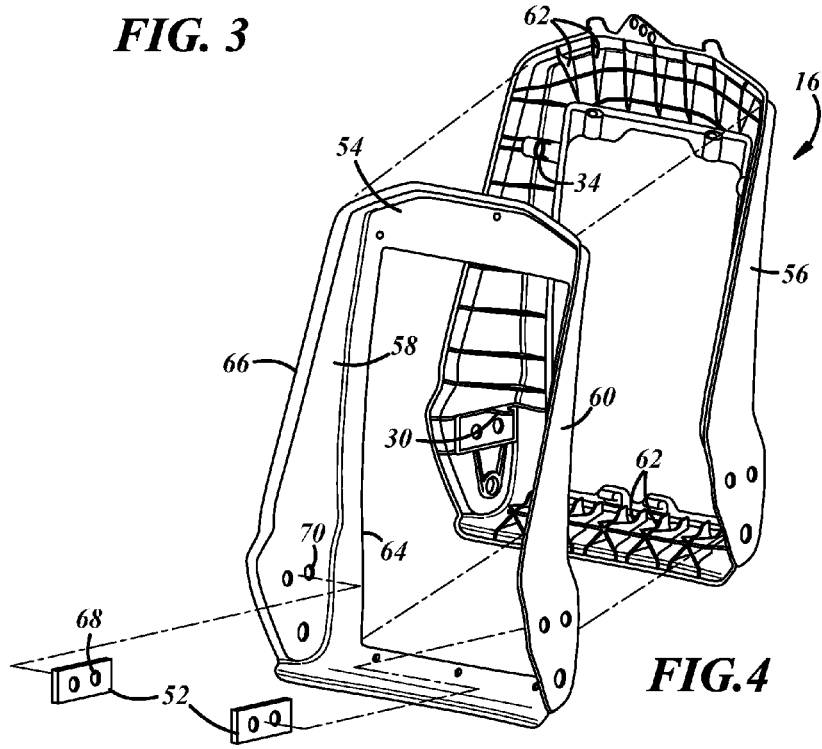
FIG. 4

VEHICLE SEAT ASSEMBLY WITH COMPOSITE FRAME

CROSS-REFERENCE TO RELATED APPLICATION

This application claims the benefit of U.S. Provisional Ser. No. 61/652,563 filed on May 29, 2012, the entire contents of which are incorporated herein by reference.

TECHNICAL FIELD

The present disclosure relates to a seat assembly and, in particular, to a seat assembly having a composite frame component.

BACKGROUND

Modern vehicle seats are complex assemblies that provide not only comfortable occupant seating surfaces, but also mounting structures and locations for various other vehicle subsystem components, such as safety system components, HVAC components, entertainment components and/or seat adjustment components, to name a few. Though plastic and other polymeric materials are now very common in vehicle interiors, the underlying structures of vehicle seats continue to be constructed primarily from metal materials because of their structural nature. But as vehicle seats have become more complex, so have the metal structures. Each additional component added to a seat assembly often requires additional metal-forming operations, weldments, brackets and/or fasteners, adding further complexity and cost to the underlying structure.

SUMMARY

In accordance with one or more embodiments, a vehicle seat assembly includes a seat bottom adapted to be coupled with a vehicle floor and a seat back coupled to and extending from the seat bottom. At least one of the seat back or the seat bottom includes a frame with a pair of laterally spaced side members and a pair of cross members spaced apart along the side members. The cross members extend between and interconnect the side members. Each of the side and cross members comprises a continuous-fiber reinforcement (CFR) material.

In accordance with one or more other embodiments, a method of making a frame for use in a vehicle seat assembly includes the steps of: (a) supporting a seat frame foundation comprising CFR material in a mold cavity; (b) filling the mold cavity with a thermoplastic material so that the thermoplastic material flows along both surfaces of the foundation; and (c) removing the frame from the mold cavity. The foundation has opposite first and second surfaces separated by a material thickness, and portions of the mold cavity are located along both surfaces of the foundation when the foundation is supported in the mold cavity. The foundation is thereby at least partially encapsulated by the thermoplastic material.

BRIEF DESCRIPTION OF THE DRAWINGS

Preferred exemplary embodiments will hereinafter be described in conjunction with the appended drawings, wherein like designations denote like elements, and wherein:

FIG. 1 is a perspective view of an embodiment of a vehicle seat assembly having a seat back with a composite frame, shown without cushions or decorative coverings;

FIG. 2 is an exploded view of the seat back of FIG. 1;

FIG. 3 is a perspective view of the composite seat back of FIG. 1;

FIG. 4 is a simulated exploded view of the composite seat back of FIG. 3;

FIG. 5 is a cross-sectional view of the seat back of FIG. 1;

DETAILED DESCRIPTION

Figure 6:
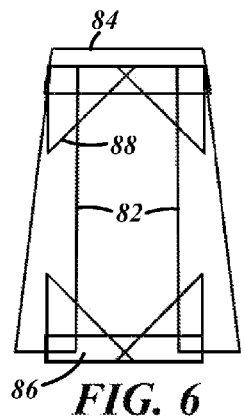
FIG. 6 is a plan view of an exemplary layout of pieces of CFR material that can be used to form a foundation of the seat frame of FIG. 3.

The seat assembly described herein employs a composite frame constructed from plastic and/or plastic composite materials, including one or more CFR materials. The CFR material may be continuous along all of the frame members to provide structural rigidity superior to that of separate pieces of CFR material. Other portions of the composite frame can be formed from a thermoplastic material in an overmolding process that at least partially encapsulates the CFR material and that provides mounting features for a variety of seat accessories. The CFR material thus imparts structural rigidity to the composite frame that the thermoplastic portion of the frame would not otherwise have, enabling the composite frame to support multiple seat accessories with easily formed mounting features that can facilitate simplified attachment of the accessories without the need for the earlier mentioned brackets, weldments or fasteners, for example.

With reference to FIG. 1, there is shown an embodiment of a vehicle seat assembly 10, including a seat bottom 12 and a seat back 14, at least one of which includes a composite frame 16. The seat bottom 12 is adapted to be coupled with a vehicle floor, and the seat back 14 is coupled to and extends from the seat bottom. In this example, the illustrated frame 16 is part of the seat back 14, but the composite frame described herein is applicable to the seat bottom 12 as well. The composite frame 16 includes a combination of a CFR material and a thermoplastic material, as described in further detail below. The frame 16 can be made to accommodate attachment of a variety of seat accessories, such as the illustrated recliner mechanism 18, lumbar support 20, shoulder support 22, entertainment unit 24, airbag module 26 and/or headrest unit 28, for example. The composite frame 16 enables multiple seat accessories to be supported by the frame in a simplified manner not possible with a metal or unreinforced plastic frame. The seat assembly 10 typically includes additional components that are not illustrated, such as foam cushions and decorative coverings, for example.

FIG. 2 is an exploded view of the seat back 14 of FIG. 1, separately showing the composite seat frame 16 and the accessories 18-28. The frame 16 includes mounting features 30-38 that accommodate attachment of the illustrated accessories. In this example, the mounting features include a recliner mount 30, a lumbar mount 32, a shoulder support mount 34, an entertainment mount 36 (not shown in FIG. 2), and an airbag mount 38. Here, the shoulder support 22 includes a headrest mount 40, but the headrest mount could be included as part of the frame 16 in other embodiments.

FIG. 3 shows the composite frame 16 with its various mounting features 30-38. The frame 16 includes a pair of laterally spaced left and right side members 42, 44 and a pair of upper and lower cross members 46, 48 spaced apart along the side members 42, 44. The cross members 46, 48 extend between and interconnect the side members 42, 44 so that, together, the side and cross members form a generally rectangular shape for the frame 16. The side and cross members 42-48 cooperate to define an opening 50 in the frame. Here the opening 50 is a central opening, but the frame 16 could include additional structural members so that the frame includes a plurality of openings surrounded by various combinations of structural members. The illustrated frame 16 also includes left and right recliner support plates 52, described in further detail below.

In at least some embodiments, each of the frame members 42-48 comprises CFR material. As used herein, CFR material is a material that includes a polymeric matrix material with continuous fibers embedded or encapsulated in the matrix material. The matrix material may be a thermoplastic or thermoset material, and the fibers can be any material in elongated form, including continuous glass fibers, carbon fibers, ceramic fibers, or certain high-strength polymeric fibers (e.g. Kevlar). Generally, the fiber length in CFR material is sufficient to span an entire formed part from one edge to an opposite edge. CFR material is typically provided in sheet form and can be made, for example, by a pulltrusion process in which the fibers are continuously supplied (e.g. in roll form) to the molten plastic through the sheet-forming die in the direction of plastic material flow so that they are encapsulated in the sheet. Thus, a single layer of material from the pulltrusion process, also referred to as a CFR tape, includes continuous unidirectional fibers. In use, the CFR material typically includes multiple layers of CFR tape bonded together with the fibers of each layer oriented in a different direction than one or more other layers. For example, one layer may be oriented with the continuous fibers generally perpendicular to the fibers of another layer, while the fibers of additional layers are oriented in yet other directions. Since the strength of each CFR tape is greatest in the fiber direction, multiple layers with differently oriented fibers can provide a sheet of CFR material with more uniform mechanical properties.

Though the composite frame 16 could be made entirely from CFR material, the example shown in the figures includes a foundation 54 that is formed from CFR material and an accessory mounting portion or shell 56 that is formed from another material. The shell 56 may be formed from a thermoplastic material (e.g. glass-filled nylon) or any other suitable material. The shell 56 includes the integrally formed mounting features 30-38 and is affixed to the foundation 54 to form the composite frame 16, which can be handled as a single component. In the examples described herein, the shell 56 is a thermoplastic material that is overmolded on the CFR foundation 54, but the foundation and shell could be otherwise attached together.

The CFR materials of each of the members may together define the foundation 54. In the illustrated embodiment, the CFR materials of each of the frame members 42-48 is arranged to form a continuous path of CFR material that surrounds the central opening 50—i.e., the foundation 54 is a continuous piece of CFR material in the finished frame 16. In other embodiments, the CFR materials of each of the frame members do not necessarily form a continuous path of CFR material around the opening in the frame, such that the foundation 54 is a collection of separate pieces of CFR material in the frame. Particularly where an overmolding process is used to form the composite frame 16, the foundation 54 may be at least partially embedded in the thermoplastic material of the shell 56. In the example of FIG. 3, for instance, the accessory mounting shell 56 is a continuous piece of material with portions located at opposite inboard and outboard sides of the foundation 54. Here, the shell 56 may also be referred to as monolithic. This is described further below with reference to additional figures.

FIG. 4 shows the composite frame 16 of FIG. 3 in a simulated exploded view with the illustrative foundation 54 separated from the shell 56. The exploded view is referred to as simulated because the illustrated composite frame 16 cannot be separated into the separate components 54, 56 as shown once the frame is formed. Nonetheless, FIG. 4 is useful to show the inboard and outboard surfaces 58, 60 of the foundation 54 as they are arranged in this example of the composite frame 16. The inboard and outboard surfaces 58, 60 of the foundation 54 are separated by the CFR material thickness. The accessory mounting shell 56 illustrated in FIG. 4 is shown as it would be formed if molded without the foundation 54—in other words, it reflects the shape of the mold cavity used to form the frame 16. But when the foundation 54 is placed in the mold cavity for an overmolding process, the foundation becomes partly embedded in the thermoplastic material of the shell 56. For example, the thermoplastic material flows along both surfaces 58, 60 of the foundation, covering substantially the entire outboard surface 60 of the foundation and forming some other features along the inboard surface of the foundation, such as the shoulder support mount 34, portions of the recliner mount 30, and stiffening ribs 62. The portions of the mold cavity that form the stiffening ribs also function to provide material flow paths along the inboard surface 58 of the foundation 54 between inner and outer perimeters 64, 66 of the foundation during molding.

FIG. 4 also shows the recliner support plates 52 separately from the foundation 54 and shell 56. The support plates 52 can be supported in the same mold cavity as the foundation 54 to be overmolded by the thermoplastic material of the shell 56, as indicated in FIG. 3. Each plate 52 includes one or more apertures 68 aligned with apertures 70 formed through the CFR material. The apertures 68, 70 cooperate to support at least a portion of a recliner mechanism of the seat assembly, as described in more detail below.

Another feature of the illustrated composite frame 16 is the cross-sectional shape of the frame members 42-48. As shown in FIG. 5, which is an enlarged cross-sectional view of the seat assembly of FIG. 1 taken through the airbag module 26, one or more of the frame members may have an S-shaped cross-section. In the particular view of FIG. 5, the left side member 42 is illustrated. As used herein, an S-shaped cross-section includes a central portion 72 and opposite end portions 74, 76 that each extend away from the central portion 72 in opposite directions. In particular, each end portion 74, 76 extends in a direction opposite the other with respect to the inboard and outboard sides 58, 60 of the foundation 54. In this example, end portion 74 extends in the outboard direction to an outer edge 78 of the frame, and end portion 76 extends in the inboard direction to an inner edge 80 of the frame. Both of the side members 42, 44 have an S-shaped cross-section in the illustrated embodiment. The CFR materials of each of the side members 42, 44 also have an S-shaped cross-section. In some embodiments, it is possible that only one of the foundation 54 or shell 56 has an S-shaped cross-section. The cross members 46, 48 may also have S-shaped cross-sections.

The S-shaped cross-section simplifies the manufacturing process for the composite frame, particularly where molding processes are used. For example, molding tool surfaces can be configured in a straight-pull arrangement, moving straight away from each other after the thermoplastic material solidifies without the need for slides, lifters, or other mold components that increase the complexity of the molding tool. Straight-pull mold surface movement with respect to the cross-section of FIG. 5 is indicated by the arrows. The S-shaped cross-section thus provides beam-like behavior along multiple axes of the cross-section, much like a U-shaped or I-shaped cross-section, but without the need for molding tool complexity required to form undercut features. FIG. 5 also shows how, in this example, the CFR material (i.e., the foundation 54) is partially embedded in the shell 56, with the thermoplastic material of the shell covering the entire outboard surface 60 of the foundation 54 and wrapping around opposite ends of the S-shaped cross-section of the foundation 54.

An exemplary method of making the above-described composite frame may include the steps of: supporting a seat frame foundation comprising CFR material in a mold cavity, filling the mold cavity with a molten thermoplastic material, and removing the frame from the mold cavity when the molten material solidifies. As described above, the foundation has opposite first and second surfaces separated by a material thickness. The foundation may be supported in the mold cavity by one or more mold cavity surfaces so that different portions of the mold cavity are located along both of the opposite surfaces of the foundation. In this manner, the molten thermoplastic material that fills the mold cavity is allowed to flow along both surfaces of the foundation and at least partially encapsulate the foundation. This overmolding process mechanically locks the thermoplastic material and the CFR material together. Some melt bonding may occur as well. For example, the matrix material of the CFR material may also be a thermoplastic material. In one embodiment, the CFR material and the overmolded thermoplastic material are from the same polymeric material family, such as polyamides, or each of the CFR and the thermoplastic materials includes a polymeric material from the same polymeric material family (e.g., polyamides, polyolefins, polyesters, polycarbonates, ABS, etc.).

To make the composite frame of FIGS. 1-5, the mold cavity is generally rectangular with the four sides of the rectangle corresponding to the pair of opposite sides and the pair of cross-members. The foundation may be supported in the mold cavity along all four sides of the rectangle, or by only one or more sides of the rectangle. In some embodiments, the foundation is provided as a single piece of CFR material in a generally rectangular shape corresponding to the shape of the mold cavity. In other embodiments, the foundation is supported in the mold cavity as a plurality of flat or pre-formed pieces of CFR material. Portions of each of the plurality of pieces may overlap one another in the mold cavity, but this is not necessary.

The method does not limit the foundation to a continuous or single rectangular formation of CFR material. The foundation may have any shape that generally fits with and can be supported by the mold cavity. Each of the finished frame members may or may not include CFR material. Where it is desired to provide the foundation as a pre-form, it may be formed monolithically from a sheet of CFR material in a process similar to thermoforming or vacuum thermoforming. The generally rectangular foundation illustrated in FIG. 4 may be so formed. In another example, the foundation includes multiple layers of CFR material, and at least one of the layers has the continuous fibers oriented in a different direction from the fibers of another layer. Where multiple layers of CFR material are used, they may have the same or different material composition and/or thickness and may or may not be bonded together prior to being placed in the mold cavity for overmolding. In some embodiments, the foundation is formed from a plurality of pieces of CFR material. Each of the plurality of pieces may be individually preformed for a subsequent foundation forming step or for placement in the mold cavity of the overmolding process. Or each of the plurality of pieces may be cut from one or more sheets of CFR material and formed together to construct the foundation.

In one embodiment, one or more recliner support plates, such as those illustrated in FIG. 4, are supported in the same mold cavity as the foundation for overmolding. To make the composite frame of FIGS. 1-4, the recliner support plates are supported in the mold cavity along the inboard side of the foundation, but they could be located along the outboard side of the foundation or not along the foundation at all.

Figure 7:
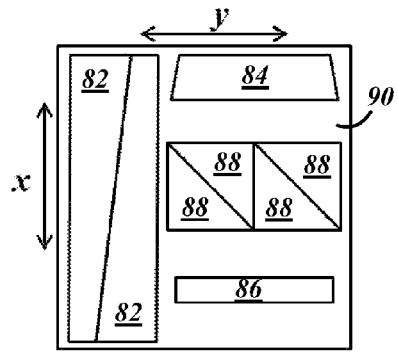
FIG. 7 is a plan view of a sheet of CFR material illustrating one manner in which the individual pieces of CFR material may be cut from the sheet to form the layout of FIG. 6.

FIGS. 6-11 illustrate various examples in which a plurality of pieces of CFR material is cut from a sheet of CFR material for subsequent arrangement and forming. FIG. 6 shows an exemplary layout or pattern of pieces of CFR material arranged together to form a generally rectangular foundation such as that shown in FIG. 4. The particular layout shown in FIG. 6 includes a pair of trapezoidal side pieces 82, an upper trapezoidal cross-piece 84, a lower rectangular cross-piece 86, and four triangular corner pieces 88 that each overlap and interconnect one of the side pieces and one of the cross-pieces. FIG. 7 illustrates one manner in which the individual pieces 80-88 may be oriented with respect to one another before being cut from a sheet of CFR material 90. The orientation in which the individual pieces 80-88 are cut from the CFR material can affect the orientation of the continuous fibers in the formed foundation. For example, if the fibers are arranged along the x-direction of FIG. 7, the fibers run the length of the cut side pieces 82 and the width of the upper and lower cross-pieces. A second set of pieces 82-88 could be cut from another sheet of CFR material with the fibers running in the y-direction. The second set of pieces can be layered with the first set of cut pieces to form the foundation so that all sides of the rectangular foundation includes fibers oriented in multiple directions. The pieces may also be cut and layered so in any off-axis manner so that layers have fibers running in non-perpendicular directions to the fibers of other layers. A different number of layers of CFR material can be included in each frame member, as well. For example, the side members of the composite frame could be formed with six layers of CFR material and the cross members of the composite frame could be formed with only four layers.

Figure 8:
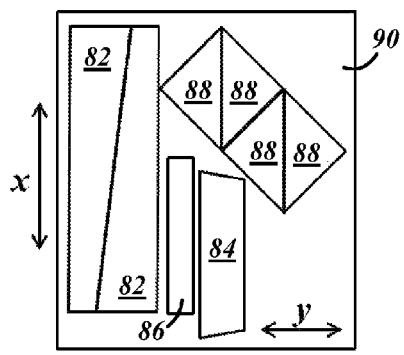
FIG. 8 is a plan view of another sheet of CFR material illustrating another manner in which the individual pieces of CFR material may be obtained from the sheet to form the layout of FIG. 6.

FIG. 8 illustrates another exemplary cutting pattern for the pieces of CFR material 80-88, in which the fibers of the side pieces 80, 82 and the fibers in the cross-pieces 84, 86 run the length of the individual pieces. Each of these examples represents a CFR material savings over forming a rectangular foundation monolithically from a sheet of CFR material, where the central opening of the foundation represents unused or wasted material. The wasted material from a monolithically formed foundation may be balanced against the additional steps and/or tooling required to cut and form individual pieces of CFR material into the foundation, and either technique may be advantageous in a particular application.

Figure 9:
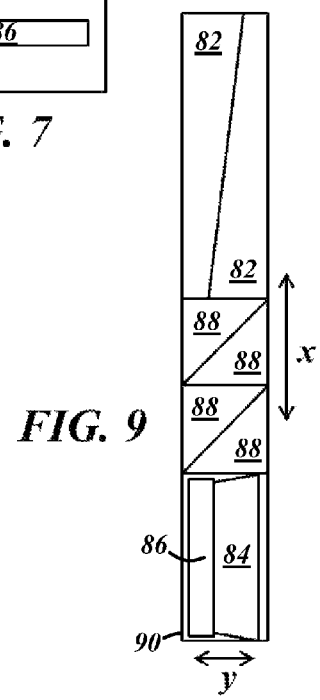
FIG. 9 is a plan view of another sheet of CFR material illustrating another manner in which the individual pieces of CFR material may be obtained from the sheet to form the layout of FIG. 6 to optimize material use.
Figure 10:
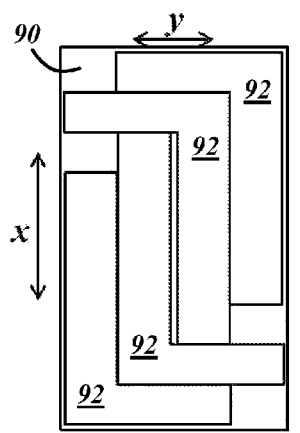
FIG. 10 is a plan view of another sheet of CFR material illustrating another manner in which individual L-shaped pieces may be obtained from the sheet to form a different layout.
Figure 11:
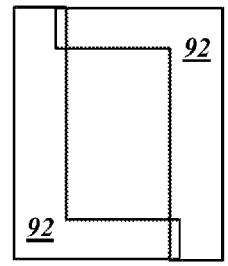
FIG. 11 is a plan view of an exemplary layout of L-shaped pieces obtained from the sheet of CFR material of FIG. 10.
Figure 12:
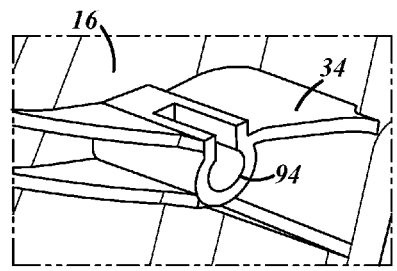
FIG. 12 is an enlarged view of an illustrative shoulder support mount of the composite frame of FIG. 3.

FIG. 9 illustrates another example of the manner in which individual pieces for use in the layout of FIG. 6 may be obtained from a sheet of CFR material with even less waste. In another embodiment, the corner pieces 88 are omitted so that the foundation is formed from four pieces—two side pieces 82 and two cross-pieces 84, 86. FIGS. 10 and 11 show yet another example of the manner in which individual pieces of CFR material may be obtained from a sheet of CFR material. L-shaped pieces 92 corresponding to a frame side member and a frame cross-member may be obtained from the sheet of CFR material 90 as shown in FIG. 10 and arranged to form the foundation as shown in FIG. 11. Additional steps may be included, such as trimming steps or steps that form additional features in the foundation (such as apertures 70 of FIG. 4). While the matrix material of the CFR material may advantageously include a thermoplastic material to promote bonding with the overmolded thermoplastic material of the accessory mounting shell, the CFR material can also include a thermosetting material. For example, the individual pieces of material could be obtained from uncured or partially cured sheet molding compound (SMC) with continuous fibers and arranged together as in FIG. 6 or 11 for forming and curing to shape.

As previously mentioned, the composite frame described above enables support for a plurality of seat accessories without the need for additional brackets, weldments or fasteners. While attempts have been made at replacing metal seat frames with plastic, thermoplastic materials are typically not sufficiently rigid for use in such a structural application, particularly over long periods of time and with exposure to the high temperatures sometimes encountered in a vehicle cabin. And while some thermoset polymeric materials may be sufficiently rigid for structural use, materials like SMC which must be formed from sheet material, pose difficulty in forming intricate features sometimes required for accessory attachment. Here, CFR material is provided as a structural foundation and a more manufacturing-friendly injection molding process can be used to form mounting features for seat accessories, so that the advantages of a structurally rigid and high-strength polymer-based material and an easily-shaped thermoplastic material can both be realized in the same frame structure. FIGS. 12-19 illustrate several non-limiting examples of seat accessories that can be coupled with the composite frame in a simplified manner.

Figure 13:
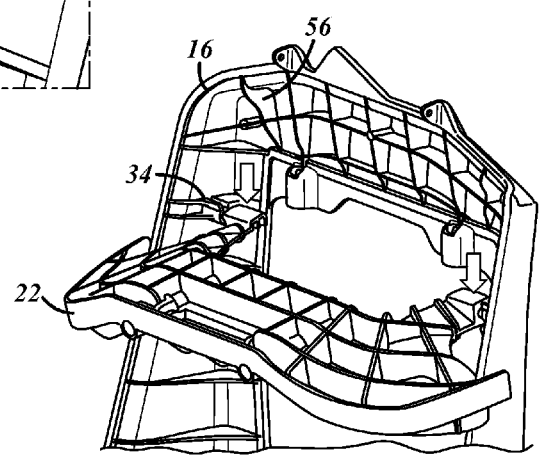
FIG. 13 is a perspective view showing a shoulder support being coupled with the composite seat frame of FIG. 3.
Figure 14:
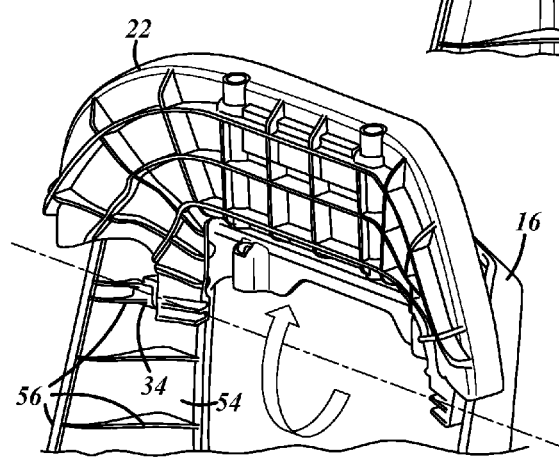
FIG. 14 is the view of FIG. 14 showing the shoulder support being pivotally moved to an upright position.
Figure 15:
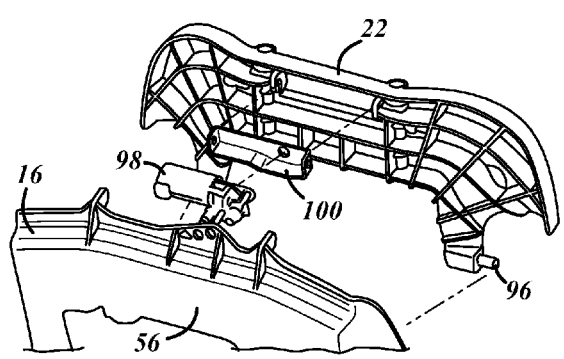
FIG. 15 is a back view of the shoulder support of FIGS. 13 and 14 showing a should support actuator for attachment between the shoulder support and composite seat frame.

FIGS. 12-15 illustrate the earlier-referenced shoulder support 22 as coupled with the above-described composite frame 16 at shoulder support mount 34. The shoulder support mount 34 includes left and right slotted cylinders 94 with upward facing slots. The right slotted cylinder 94 is shown in an enlarged view in FIG. 12. The illustrated shoulder support 22 includes opposite left and right posts 96, each with a rectangular cross-section configured so that the posts fit into the slots of the slotted cylinders 94 with the main body of the shoulder support oriented horizontally as shown in FIG. 13. Once the posts 96 are in the slotted cylinders 94, the shoulder support 22 is rotated to the vertical position of FIG. 14, with the posts confined to the slotted cylinders as pivot joints. The slotted cylinders could have forward facing slots instead, or the slotted features could be part of the shoulder support instead of the mounting shell 56. The illustrated shoulder support 22 can be fixed at the vertical position of FIG. 14 by other attachment features. Or, where it is desired that the seat assembly include an adjustable should support, a motor-driven actuator or other adjustment mechanism may be provided. In the illustrated example, an optional motor 98 and bracket 100 are shown in FIG. 15. The bracket 100 is attached to the shoulder support 22 by fasteners or molded-in features, for example, and the actuator 98 is attached to the bracket. The actuator 98 can be energized to adjust the amount of tilt of the shoulder support 22.

Figure 16:
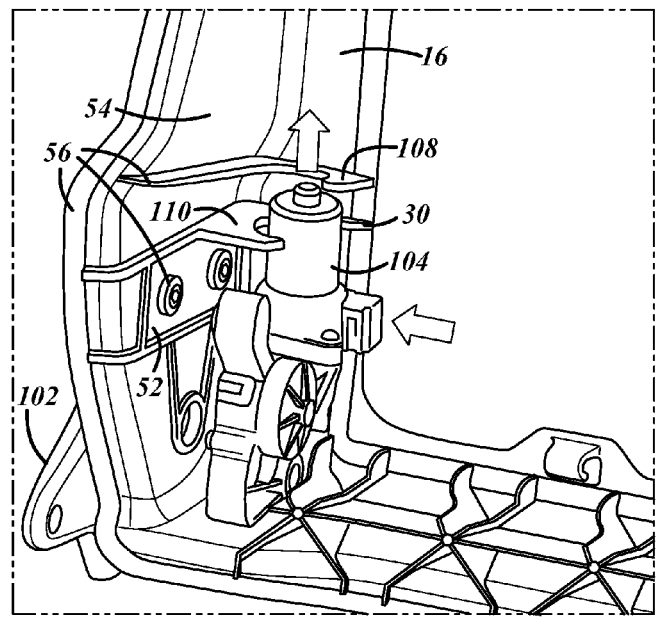
FIG. 16 is a perspective view of a recliner mount of the composite frame of FIG. 3, showing a recliner mechanism motor being coupled with the frame.
Figure 17:
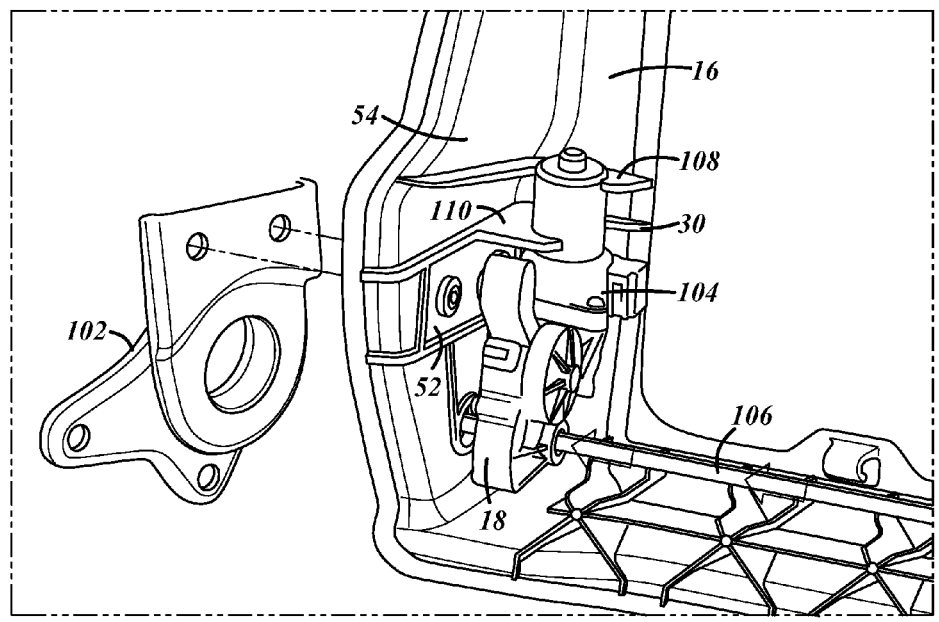
FIG. 17 is the perspective view of FIG. 16 showing a recliner mechanism rod coupled with the motor and a pivotal hinge adapted for attachment to the composite frame.

FIGS. 16 and 17 illustrate the earlier-referenced recliner mechanism 18 as assembled to the illustrative recliner mount 30. The recliner mechanism 18 is adapted to allow pivotal movement of the seat back with respect to the seat bottom about an axis and includes opposite left and right pivotal hinges 102, a motor 104, and a rod 106. The recliner mount 30 includes upper and lower mounting flanges 108, 110 that cooperate with apertures of the recliner support plate 52 and foundation 54 and with the portion of the overmolded shell 56 that extends through the apertures to mount the recliner mechanism 18. In this example, the motor 104 is first positioned within the lower flange 110 of the recliner mount 30, then moved in an upward direction to engage the upper flange 108. Each flange 108, 110 supports sides of the motor 104 from opposite directions to hold the motor in place without fasteners, though fasteners may be used in some embodiments. With the motor 104 in place, the rod 106 is inserted through additional apertures formed through the composite frame to mate with the motor and extend past the frame 16 at its opposite ends to be coupled with other seat assembly components to operate the pivotal hinges 102. The hinges 102 may be attached to the composite frame 16 at the support plates 52 by threaded fasteners or other suitable means.

Figure 18:
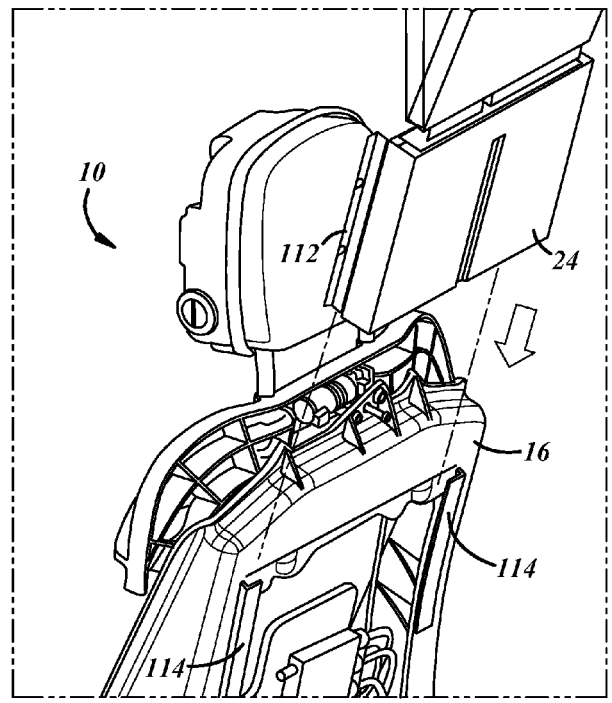
FIG. 18 is a rear perspective view of the seat assembly of FIG. 1, showing an entertainment unit being coupled with the composite seat frame.

FIG. 18 illustrates the entertainment unit 24 as it may be coupled with the composite seat frame 16. The illustrated entertainment unit 24 includes opposite left and right rails or tracks 112 that mate with rail or track receivers 114 of the entertainment mount 36. Rails 112 and receivers 114 may be configured with complimentary cross-sectional shapes so that the entertainment unit 24 can slide into place in a downward direction as shown. This is another example of a fastenerless attachment of a seat accessory, though fasteners may optionally be used.

Figure 19:
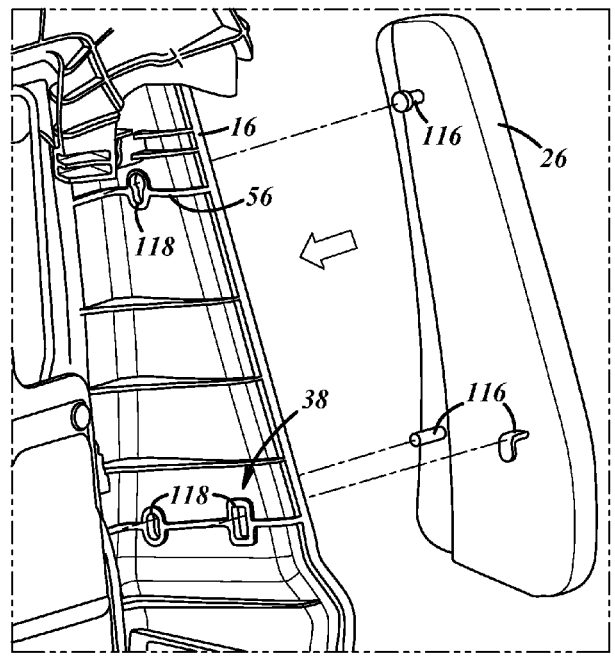
FIG. 19 is a perspective view of an airbag module being coupled with the composite seat frame.

FIG. 19 illustrates another fastenerless attachment of a seat accessory, here with the side airbag module 26. The module 26 includes posts or tabs 116 that are received by slots 118 of the airbag mount 38 that extend through the accessory mounting shell 56. As with the apertures used with the recliner mount of FIGS. 16 and 17, thermoplastic material of the shell 56 extends through openings in the foundation to form the slots 118. Three different slot 118 shapes are shown here, with a top keyhole slot lower rectangular and oblong slots. The posts or tabs 116 of the module 26 are shaped accordingly, with the top post having a head that locks the module to the frame when inserted through the keyhole slot and moved in a downward direction. One or more of the post/slot pairs can include such a locking arrangement, and one or more of the post/slot pairs can be provided for alignment purposes only. Here, one of the lower posts 116 is cylindrical and locates the module 26 along the oblong lower slot 118, which the other lower post includes a locking feature that holds the module in place after it is received by the rectangular slot and moved in a downward direction.

Fastenerless attachment of the lumbar support 20 can be described with reference to FIG. 2. The lumbar support is configured to allow adjustment adjust the angle of lumbar support in the seat assembly. The illustrated lumbar mount 32 includes upper features 120 and lower features 122. The upper features 120 include apertures configured to receive hooked end portions 124 of the lumbar support 20 such that gravity holds the lumbar support in place on the upper features 120. The lower features 122 are snap tabs that receive a complimentary portion of the lumbar support 20 in locking engagement. In one embodiment, the lumbar support 20 includes a wire-form mounting member 126 that provides the left and right hooked end portions 124 and extends along the back side of the lumbar support where a horizontal portion of the mounting member extends across the lumbar support and engages the lower features of the lumbar mount 32.

Accessories 20-28 are of course only examples of the types of devices that can be advantageously supported by the above-described composite frame in a simplified manner. As vehicle seat assemblies increase in complexity and are expected to support additional accessories or modules, the composite seat frame can be adapted to accommodate the increased complexity.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat assembly, comprising:
    a seat bottom adapted to be coupled with a vehicle floor;
    a seat back coupled to and extending from the seat bottom, at least one of the seat back or seat bottom having a frame that includes a pair of laterally spaced side members and a pair of cross members spaced apart along and extending between the side members to interconnect the side members and form a closed loop in the frame, wherein each of said members comprises a continuous-fiber reinforced (CFR) material, and
    a foundation comprising the CFR material of each of said members, wherein the CFR material of each one of said members engages the CFR material of another one of said members to form a continuous closed-loop path of CFR material that at least partially defines the closed loop of the frame; and
    an accessory mounting portion including integrally formed mounting features, wherein the accessory mounting portion is monolithically formed from a thermoplastic material in which the foundation is at least partially embedded such that the thermoplastic material wraps around at least a portion of both an inner edge and an outer edge of the foundation, the integrally formed mounting features being molded-in features of the monolithically formed accessory mounting portion and formed entirely from the same thermoplastic material.

2. A vehicle seat assembly as defined in claim 1, wherein the continuous closed-loop path of CFR material surrounds an opening defined in the frame by said members.

3. A vehicle seat assembly as defined in claim 1, wherein portions of the accessory mounting portion are located at opposite inboard and outboard sides of the foundation.

4. A vehicle seat assembly as defined in claim 1, further comprising a recliner support plate located along each of the side members, wherein the support plates include one or more apertures aligned with apertures formed through the CFR material, said apertures supporting at least a portion of a recliner mechanism.

5. A vehicle seat assembly as defined in claim 1, wherein each of the side members has an S-shaped cross-section.

6. A vehicle seat assembly as defined in claim 1, wherein the CFR material of each of the side members has an S-shaped cross-section.

7. A vehicle seat assembly as defined in claim 6, wherein the S-shaped cross-section has opposite ends with the thermoplastic material of the accessory mounting portion wrapped around both opposite ends.

8. A vehicle seat assembly as defined in claim 1, wherein the foundation is formed from a plurality of pieces of CFR material.

9. A vehicle seat assembly as defined in claim 8, wherein the plurality of pieces of CFR material includes two L-shaped pieces.

10. A vehicle seat assembly as defined in claim 8, wherein the plurality of pieces of CFR material includes two side pieces corresponding to the laterally spaced sides of the frame and two cross pieces corresponding to the pair of cross-members of the frame.

11. A vehicle seat assembly as defined in 10, wherein the plurality of pieces of CFR material includes at least one corner piece that overlaps one of side pieces and one of the cross pieces.

12. A vehicle seat assembly as defined in claim 4, where the recliner support plate is at least partially embedded in the thermoplastic material.

13. A vehicle seat assembly as defined in claim 1, wherein at least one of the integrally formed accessory mounting features is configured for attachment of at least one of the following seat accessories to the frame: a shoulder support, a recliner mechanism, an entertainment unit, an airbag module, or a lumbar support.

14. A vehicle seat assembly as defined in claim 1, wherein at least one of the integrally formed accessory mounting features is configured for attachment of a shoulder support that includes a headrest mount.

15. A vehicle seat assembly as defined in claim 1, wherein at least one of the integrally formed accessory mounting features is configured for attachment of one of the plurality of seat accessories to the frame via a fastenerless attachment.

16. A vehicle seat assembly, comprising:
a seat bottom adapted to be coupled with a vehicle floor;
a seat back coupled to and extending from the seat bottom, at least one of the seat back or seat bottom having a composite frame that includes a pair of laterally spaced side members and a pair of cross members spaced apart along and extending between the side members to interconnect the side members and to define an opening in the frame, each of said members comprising a continuous-fiber reinforced (CFR) material, wherein the CFR material of each one of said members is in sheet form and engages the CFR material of another one of said members to form a continuous closed-loop path of CFR material that surrounds said opening,
wherein the frame further comprises a foundation and an accessory mounting portion, the foundation being formed entirely from the CFR material and having opposite inboard and outboard surfaces separated by a CFR material thickness, and the accessory mounting portion being monolithically formed from a thermoplastic material overmolded on and partially encapsulating the foundation such that each of said side members includes the thermoplastic material at both the inboard surface and the outboard surface of the foundation and wrapped around at least a portion of both an inner edge and an outer edge of the foundation without entirely covering the foundation in the thermoplastic material, and
wherein the accessory mounting portion further comprises mounting features monolithically formed from the overmolded thermoplastic material, each one of the mounting features being configured for attachment of a seat accessory to the frame.

17. A vehicle seat assembly as defined in claim 16, wherein each of the accessory mounting features is configured to receive a corresponding feature of the seat accessory such that the corresponding feature is in sliding engagement with the thermoplastic material of the accessory mounting portion during attachment of the seat accessory to the frame.

18. A vehicle seat assembly as defined in claim 16, wherein each of the accessory mounting features is configured for fastenerless attachment of the seat accessory to the frame.

* * * * *